United States Patent Office 2,855,425
Patented Oct. 7, 1958

2,855,425

O - (2,6 - DICYCLOHEXYL - 4 - METHYLPHENYL) O - METHYL N - ALKYL PHOSPHOROAMIDO-THIOATES

Henry Tolkmith and Edgar C. Britton, Midland, Mich., assignors to The Dow Chemical Company, Midland, Mich., a corporation of Delaware No Drawing. Application April 4, 1956
Serial No. 575,956

3 Claims. (Cl. 260—461)

This invention is directed to the O-(2,6-dicyclohexyl-4-methylphenyl) O-methyl N-alkyl phosphoroamidothioates having the formula

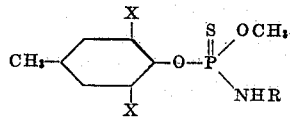

In this and succeeding formulas, X represents a cyclohexyl radical and R represents methyl or ethyl. These new compounds are crystalline solids, somewhat soluble in many organic solvents and of very low solubility in water. They have been found to be active as parasiticides and are adapted to be employed as active toxic constituents of compositions for the control of bacteria, soil dwelling nematodes, insect organisms and fungi such as *Fusarium oxysporum lycopersii*.

The new compounds may be prepared by reacting methyl amine or ethyl amine with an O-(2,6-dicyclohexyl-4-methylphenyl) phosphorodichloridothioate having the formula

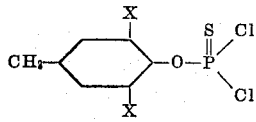

to prepare an O-(2,6-dicyclohexyl-4-methylphenyl) N-methyl phosphoroamidochloridothioate or O-(2,6-dicyclohexyl-4-methylphenyl) N-ethyl phosphoroamidochloridothioate intermediate. The phosphoroamidochloridothioate intermediate is then reacted with an alkali metal methylate to produce the desired product. The reactions are somewhat exothermic and the temperature may be controlled by regulating the rate of contacting the reagents and by external cooling.

In carrying out the first part of the reaction, two molecular proportions of methyl amine or ethyl amine are contacted portionwise with one molecular proportion of the O-(2,6-dicyclohexyl-4-methylphenyl) phosphorodichloridothioate reagent at a temperature of from —10° to 30° C. This operation is carried out with stirring and in the presence of a solvent such as benzene or toluene. During the operation the reaction takes place smoothly with the formation of the desired phosphoroamidochloridothioate intermediate and amine hydrochloride of reaction. Upon completion of the reaction, the reaction mixture is filtered to separate amine hydrochloride. The filtrate is a solvent solution of the desired intermediate. This solution may be used in the second portion of the reaction or the solvent removed by evaporation or fractional distillation under reduced pressure to obtain the intermediate as a residue.

In the second part of the reaction, a solution of one molecular proportion of an alkali metal methylate in one of the previously mentioned solvents or in methanol is contacted portionwise with one molecular proportion of the phosphoroamidochloridothioate intermediate dissolved in the reaction solvent. The contacting is carried out with stirring and at a temperature of from 0° to 80° C. When the reaction is complete, any solvent may be removed by evaporation, the reaction product dissolved in a water-immiscible solvent such as benzene and the solvent solution washed with water. The solvent is then removed by evaporation or by fractional distillation under reduced pressure to obtain the desired product as a crystalline residue.

The following examples illustrate the invention but are not to be construed as limiting.

EXAMPLE 1

*O-(2,6-dicyclohexyl-4-methylphenyl) O-methyl N-methyl phosphoroamidothioate*

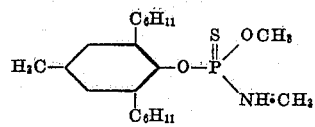

Gaseous methyl amine (62 grams, 2.0 moles) was added gradually with stirring to 405 grams (1.0 mole) of O-(2,6-dicyclohexyl-4-methylphenyl) phosphorodichloridothioate dissolved in 1.5 liters of benzene and 0.5 liter of toluene. The addition was carried out over a period of one hour and at a temperature of 10° C. Following the addition, the reaction mixture was filtered to separate amine hydrochloride, the solvent removed from the filtrate by evaporation, and the residue washed with a petroleum ether boiling at from 30° to 60° C. and thereafter recrystallized from cyclohexane. As a result of these operations, there was obtained an O-(2,6-dicyclohexyl-4-methylphenyl) N-methyl phosphoroamidochloridothioate product as a crystalline solid.

Sodium (2.3 grams, 0.1 mole) was dissolved in 100 milliliters of methanol to prepare a methanol solution of sodium methylate. This solution was added portionwise with stirring to forty grams (0.1 mole) of the above prepared phosphoroamidochloridothioate intermediate dissolved in 400 milliliters of benzene. The addition was carried out over a period of one hour and at a temperature of from 5° to 20° C. Stirring was thereafter continued for 0.5 hour at the boiling temperature and under reflux to complete the reaction. The reaction mixture was then filtered and the solvent removed from the filtrate by evaporation to obtain an O-(2,6-dicyclohexyl-4-methylphenyl) O-methyl N-methyl phosphoroamidthioate product as a crystalline solid. The latter was recrystallized from cyclohexane and found to melt at 154°–156° C.

EXAMPLE 2

*O-(2,6-dicyclohexyl-4-methylphenyl) O-methyl N-ethyl phosphoroamidothioate*

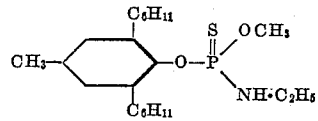

Gaseous ethylamine (9 grams, 0.2 mole) was added portionwise with stirring to 40.5 grams (0.1 mole) of O - (2,6-dicyclohexyl-4-methylphenyl) phosphorodichloridothioate dissolved in 400 milliliters of benzene. The addition was carried out over a period of 0.5 hour and at a tempreature of from 8° to 12° C. Following the addition the reaction mixture was filtered to separate amine hydrochloride and obtain a benzene solution of an O-(2,6-dicyclohexyl-4-methylphenyl) N-ethyl phosphoroamidochloridothioate intermediate.

Sodium (0.1 mole) was dissolved in 100 milliliters of methanol to prepare a methanol solution of sodium methylate. This solution was added portionwise with stirring to the above benzene solution of the phosphoroamidochloridothioate intermediate. The addition was carried out over a period of one hour and at a temperature of from 10° to 15° C. Following the addition the reaction mixture was washed with water, and the solvent removed from the filtrate by evaporation to obtain an O-(2,6-dicyclohexyl-4-methylphenyl) O-methyl N-ethyl phosphoroamidothioate product as a crystalline residue. This product was recrystallized from cyclohexane and found to melt at 148°–149° C.

The new O-(2,6-dicyclohexyl-4-methylphenyl) O-methyl N-alkyl phosphoroamidothioates are effective as parasiticides and are adapted to be employed for the control of many household and agricultural pests. For such use the products may be dispersed on a finely divided carrier and employed as dusts. The new products may also be dispersed in water with the aid of a wetting agent and the resulting aqueous suspensions employed as sprays. The products may also be employed in oils or as constituents of oil-in-water emulsions. In representative operations, 100 percent controls of Mexican bean beetles are obtained with aqueous compositions containing 3 pounds of O-(2,6-dicyclohexyl-4-methylphenyl) O-methyl N-methyl phosphoroamidothioate per 100 gallons of ultimate mixture.

The O-(2,6-dicyclohexyl-4-methylphenyl) phosphorodichloridothioate employed as starting materials may be prepared by reacting a molecular excess of phosphorus thiochloride with a 2,6-dicyclohexyl-4-methyl phenol in the presence of pyridine as a hydrogen chloride acceptor. Good results are obtained when employing from four to ten moles of $PSCl_3$ and one mole of pyridine per mole of phenol. In carrying out the reaction, the phenol and phosphorus thiochloride are dissolved in a suitable organic solvent such as benzene. The pyridine also dissolved in the reaction solvent is then added portionwise at a temperature of from 40° to 90° C. and the reaction mixture stirred at this temperature for a period of time to complete the reaction. Upon completion of the reaction, the pyridine hydrochloride is removed by filtration and the filtrate evaporated under vacuum to obtain the desired product as a residue.

We claim:

1. An O-(2,6-dicyclohexyl-4-methylphenyl) O-methyl N-alkyl phosphoroamidothioate having the formula

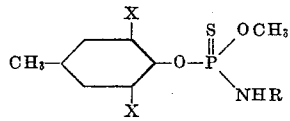

wherein X represents a cyclohexyl radical and R represents a member of the group consisting of methyl and ethyl.

2. O-(2,6-dicyclohexyl-4-methylphenyl) O-methyl N-methyl phosphoroamidothioate.

3. O-(2,6-dicyclohexyl-4-methylphenyl) O-methyl N-ethyl phosphoroamidothioate.

References Cited in the file of this patent

UNITED STATES PATENTS 2,506,344    Cleary _____ May 2, 1950

FOREIGN PATENTS 814,152    Germany _____ Sept. 20, 1951